United States Patent [19]
Friedrich et al.

[11] 3,907,749
[45] Sept. 23, 1975

[54] POLYOLEFINES WITH INCREASED STABILITY ON PROCESSING, AND WITH IMPROVED COLOUR

[75] Inventors: Hans-Helmut Friedrich, Lindenfels, Odenwald, Germany; Helmut Linhart, Reinach, Switzerland; Hermann O. Wirth, Bensheim-Auerbach, Germany

[73] Assignee: Ciba-Geigy Corporation, Ardsley, N.Y.

[22] Filed: May 13, 1974

[21] Appl. No.: 469,273

[30] Foreign Application Priority Data
May 17, 1973 Germany............................ 2324922

[52] U.S. Cl................ 260/45.85 R; 260/45.95 G; 260/45.95 N; 260/45.95 S; 260/836

[51] Int. Cl.²........................................ C08F 45/60

[58] Field of Search... 260/45.95 L, 45.95 S, 45.95 N, 260/45.95 G, 836, 45.85 R

[56] References Cited
UNITED STATES PATENTS

| | | | |
|---|---|---|---|
| 2,624,719 | 1/1953 | Roche et al. | 260/45.95 L |
| 3,375,213 | 3/1968 | Press | 260/895 |
| 3,652,494 | 3/1972 | Baker | 260/45.7 R |
| 3,669,926 | 6/1972 | Cyba | 260/45.7 R |
| 3,678,136 | 7/1972 | Vandenberg | 260/45.7 R |
| 3,700,625 | 10/1972 | Brady et al. | 260/45.7 R |

*Primary Examiner*—V. P. Hoke
*Attorney, Agent, or Firm*—Luther A. R. Hall; Nestor W. Shust

[57] ABSTRACT

Substances which are obtained by reaction of alcohols or mercaptans with glycidol effect an improved stability to processing and colour in polyolefins.

5 Claims, No Drawings

POLYOLEFINES WITH INCREASED STABILITY ON PROCESSING, AND WITH IMPROVED COLOUR

The invention relates to plastics compositions and to mouldings, films and fibres which can be manufactured therefrom and have improved stability on processing and improved colour stability.

The compositions concerned are polyolefines such as polypropylene and polyethylene as well as their copolymers and mixtures, which attain increased stability on processing and increased colour stability as a result of containing glycerol monoethers and compounds derived therefrom.

All thermoplastics, particularly the polyolefines manufactured with ZIEGLER-NATTA catalysts, suffer a degradation on processing, which cannot be eliminated entirely by anti-oxidants such as hindered phenols. Presumably, inter alia, radicals of polymerisation catalysts are originally responsible for the degradation.

This thermo-oxidative degradation, which can also be influenced additionally by traces of metals originating from the processing machinery, and which, inter alia, manifests itself in an increase in the melt index, ultimately leads to a limitation on the processing temperatures and hence on the output achievable during processing.

The products hitherto employed, such as, for example, glycerol monostearyl ester, are not satisfactory, and this is related to their own low heat stability, but above all to their high volatility.

The thermo-oxidative degradation is frequently accompanied by a discolouration. There are indications that decomposition products of the phenolic antioxidants contribute to this colour effect.

It is the task of the present invention to eliminate these shortcomings, that is to say to develop plastics compositions which exhibit increased stability on processing and better colour stability.

It has now been found that glycerol monoethers and glycerol monothioethers and compounds and substances derived therefrom impart substantially improved stability on processing and colour stability to polyolefines, especially to the polymers manufactured using ZIEGLER-NATTA catalysts.

The present invention therefore relates to polyolefines with improved stability on processing and improved colour stability which contain 0.01 – 5% by weight, preferably 0.05 – 2% by weight, based on the polymer, of a compound or mixtures of the formula I $$R-X-(CH_2-Y-O-)_nH \qquad (I)$$

in which X denotes —O—, —S— or —SO$_2$—, Y denotes

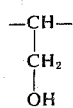

or

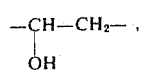

$n$ denotes the number 1 to 5, preferably 1, in the case of compounds, or $\bar{n}$ (as an average value) denotes a rational number between 1 and 8, preferably 1 – 3, in the case of statistical mixtures, and R denotes cycloalkyl with 5 to 6 C atoms, preferably 6 C atoms, phenylalkyl with an alkyl radical of 1 to 2 C atoms, which can be substituted by methyl on the phenyl nucleus, with the phenylalkyl radical R being allowed to have a total of at most 8 C atoms, phenyl which can be substituted by halogen, especially chlorine, methyl, ethyl, methoxy, ethoxy or methoxycarbonyl, with the subtituted phenyl radical being allowed to have at most 8 C atoms, or, in the case that $n = 1$, alkyl with a total of 4 to 11 C atoms, preferably 6 to 10 C atoms, which can be linear, or have short branch chains of at most 2 C atoms and/or can be unsaturated, or, in the case that $\bar{n} = 1$ to 1.9, alkyl with 4 to 7 C atoms, which can be linear, branched and/or unsaturated, or in the case that $n = 2$ to 5 and $\bar{n} = 2$ to 8, alkyl with 1 to 7 C atoms, preferably with 4 to 6 C atoms, which can be linear, branched and/or unsaturated, it also being possible, in all cases, for the alkyl chain to be interrupted, preferably only once, by —O—, —S—, —CO$_2$— or

and optionally, in addition to further additives, at most 1% by weight, relative to the polyolefine, of hydrophilic polymers, but preferably no hydrophilic polymers.

By the presence of short branch chains there is to be understood that the linear alkyl chain is substituted by one or more methyl or ethyl groups.

Preferred compounds of the formula I are those in which X represents —S— or especially —O—, $n = 1$ and R represents unbranched alkyl with 4 – 11 C atoms, or $\bar{n} = 1$ to 5 and R represents unbranched alkyl with 4 – 7 C atoms. The preferred substrate is low pressure polyethylene or polypropylene.

The substances used in accordance with the present application are of a previously known type. However, what is not previously known is the use, disclosed here, for improving the stability on processing, and colour stability, of polyolefines. CA 65, 5368 (1966); J. Amer. Chem. Soc. 72, 3711 (1950) and CA 55, 17487 (1961) have already described some examples of these classes of compounds.

Admittedly, U.S. Patent Specification No. 2,624,719 describes secondary alcohols or ether-alcohols, such as, for example, 3-ethoxy-1,2-propanediol, as auxiliaries for improving the colour of polystyrene. However, the products of the present invention are distinctly superior to the above additives in respect of this action.

Further, it is known from U.S. Patent Specification No. 3,375,213 to employ the synergistic combination of hydrophilic polymers with alkyl ethers and alkyl esters of polyhydroxy compounds for improving the dyestuff receptivity of polyolefines. However, it has now been found that the sole use of glycerol monoethers and substances related thereto imparts to polyolefines a property independent thereof, namely an improvement in processing and in colour, without at the same time having to tolerate the disadvantage of an adverse influence on the mechanical properties and processing properties of these polymers resulting from the content of a hydrophilic polymer.

Examples of compounds used according to the invention are are:

a) 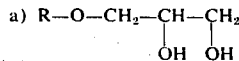

R: n-Octyl, n-butyl, 2-ethylhexyl, iso-nonyl, n-undecyl; benzyl, phenylethyl, cyclopentyl, cyclohexyl; phenyl, p-ethylphenyl, p-cresyl, p-chlorophenyl, m-bromophenyl, o-chlorophenyl, p-methoxyphenyl, or p-carboxyethylphenyl; $H_3C-CH_2-O-CH_2-CH_2-$, $H_3C-CH_2-S-CH_2-CH_2-CH_2-$ or $H_2C=HC-CH_2-$.

b) 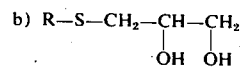

R: n-Hexyl, n-octyl, n-decyl, benzyl or phenyl; i—octyl—O—CO—CH$_2$—, i—octyl—O—CO—CH$_2$—CH$_2$—, $H_3C-CH_2-O-CO-CH_2-CH_2-$ or

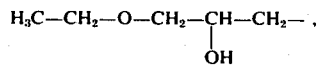

c) 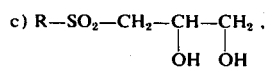

R: n-Butyl, methyl, i-butyl or n-hexyl; phenyl. d. Further compounds of the formula I, wherein $n$ is greater than 1, are obtainable by isolation from the corresponding glycidolisation mixtures, examples being

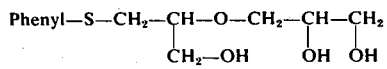

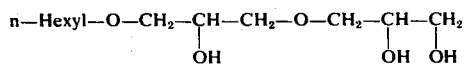

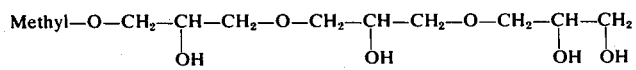

The following are preferred additives:

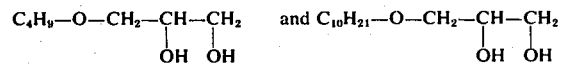

as well as the mixtures wherein the configuration

denotes

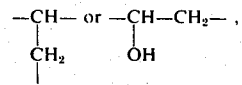

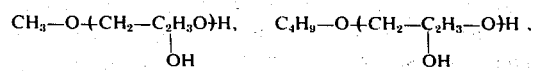

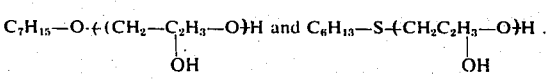

The compounds and mixtures of the formula I are used as additives for polyolefines. Examples of such polyolefines are: polyethylene, which can optionally be cross-linked, polypropylene, polyisobutylene, polymethylbutene-1, polymethylpentene-1, polybutene-1, polyisoprene, polybutadiene, polyisobutylene, copolymers of the monomers on which the said homopolymers are based, such as ethylene-propylene copolymers, propylenebutene-1 copolymers, propylene-isobutylene copolymers and terpolymers of ethylene and propylene with a diene such as, for example, hexadiene, dicyclopentadiene or ethylidenenorbornene, and mixtures of the abovementioned homopolymers such as, for example, mixtures of polypropylene and polyethylene, polypropylene and polybutene-1, or polypropylene and polyisobutylene.

Together with the substances of the formula I used according to the invention, the polyolefines can contain the customary additives used for processing these polymers, such as plasticisers, heat stabilisers, antioxidants, light protection agents, dyestuffs, fillers, lubricants and flame-proofing agents. However, hydrophilic polymers such as, for example, polyethylene oxides and substances related thereto should at most be present in amounts of 1% by weight, relative to the thermoplastics, and preferably not be present at all, so as not to influence adversely the mechanical properties and processing properties.

The substances according to the invention are incorporated into the substrates in a concentration of 0.01 to 5% by weight, calculated relative to the material to be processed. Preferably, 0.05 to 2, and particularly preferentially 0.1 to 1.0, % by weight of the substances are incorporated into the substrates.

The incorporation can take place after polymerisation, for example by mixing the substances and, optionally, further additives into the melt in accordance with the methods customary in the art, before or after shaping. The substances can also be incorporated into the polymers which are to be treated, in the form of a master batch which contains these compounds in, for example, a concentration of 2.5 to 25% by weight.

Further details of the method of incorporation can be found in Examples 35 – 37.

The preparation of the compounds of the formula I used according to the invention, in which n denotes 1, can be effected according to various processes. Advantageously, glycidol is used as the starting compound.

Phenols react under anionic conditions, at temperatures below 100°C, solely with the formation of glycerol monoethers. The same is also true of mercaptans, as shown for an example below:

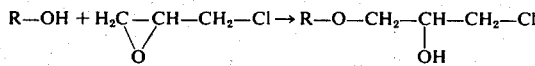

In the case of alcohols, mixtures of different stages of glycidolisation are obtained in principle. However, through using excess alcohol the reaction can largely be influenced to favour the mono-reaction product, that is to say the pure glycerol monoether. The excess alcohol is removed again during working up and added to the next batch.

A second method of synthesis which is also known is via the epichlorohydrin:

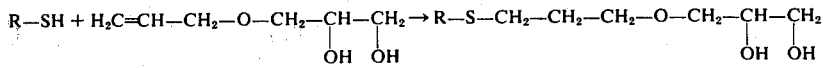

The "chlorohydrin" formed in the first stage gives the desired end product on alkaline saponification.

For the preparation of glycerol monoaryl ethers there is a second method, via 1-chloro-dihydroxypropane, in accordance with the following example:

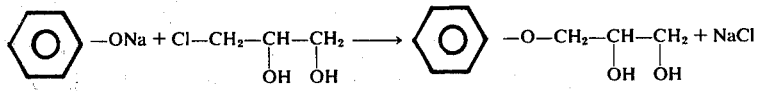

This method can also be followed in the case of the mercaptan series.

A method of preparation of glycerol monothioethers which deserves particular mention is that of addition of a mercaptan to glycerol monoallyl ether, as formulated for a general example below:

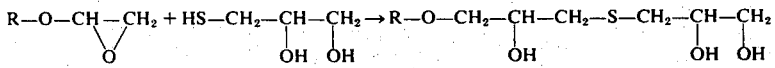

A further type of compound is obtained by addition reaction of monothioglycerol with glycidyl ethers:

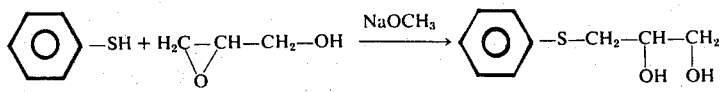

The sulphones, $X = SO_2$ (in the general formula) can be obtained by oxidation of the corresponding thioethers by means of peracetic acid or formic acid/hydrogen peroxide:

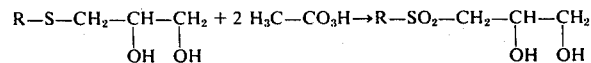

Compounds of the formula I, wherein n is greater than 1 can be isolated from the corresponding glycidolisation mixtures treated below. The isolation can be effected by fractional vacuum distillation or, in the case of products of higher n, by fractional molecular distillation, or by chromatographic methods, particularly by gel permeation chromatography.

The stepwise synthesis via epichlorohydrin is another method leading to such products.

The products of the formula I, used according to the invention, in which $\bar{n} = 1$ to 8, that is to say mixtures, are glycidolisation products. They represent an important part of the present invention and are obtainable in accordance with the general reaction equation shown below:

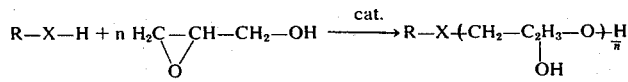

These products are statistical mixtures with $\bar{n}$ as the average value of the particular degree of glycidolisation. The distribution function $\Delta n/n$ versus $n$ was not determined in more detail. As result of the "distribution", which is subject to the laws of statistics and which can barely be influenced through the reaction conditions, some starting product always remains in all the glycidolisation products though its proportion decreases with the degree of glycidolisation $\bar{n}$. The presence of the starting product does not impair the technological properties of these products, so that its removal can be dispensed with.

In the case of the alcohols, such statistical mixtures are formed under all conditions. In the case of mercaptans and phenols, they are formed in particular under the anionic catalysis conditions at temperatures above 120°C.

With the glycidolisation derivatives which contain more than one glycidol structural unit in the molecule, two structural types, A and B, are possible:

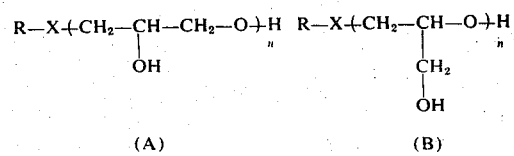

(A)                (B)

If the glycidolisation takes place as an open reaction sequence in mutually independent reaction steps, structural type A is preferred. However, if the reaction takes place in a closed reaction sequence (in the sense of a polymerisation or telomerisation), structural type B is formed. With certain limitation it is possible, through choice of the reaction conditions (catalyst and temperature) to steer the course of the reaction towards structural type A or structural type B.

In the case of alcohols, the glycidolisation, that is to say the reaction with glycidol, is best carried out under cationic conditions with tin-(IV) chloride as the catalyst. The reaction is advantageously carried out by adding the glycidol dropwise to the starting product to which catalyst has been added. However, other types of cationic catalyst, for example FRIEDEL-CRAFTS catalysts, perchlorates and oxonium salts — and including syn-catalytic systems — can also be used successfully.

The reaction can be carried out even at room temperature; it is strongly exothermic. Solvents are generally not required. It is advantageous to carry out the reaction at a temperature which is just above the melting point of the alcohol to be reacted. Suitable solvents are inert aromatic compounds (benzene, chlorobenzene or dichlorobenzene), halogenated hydrocarbons, such as, for example, sym-tetrachloroethane, or carbon disulphide.

The reaction products formed under such conditions preferentially belong to structural type A. At temperatures above 100°, the formation of B is more strongly favoured.

In the case of phenols, cationic catalysts lead to side-reactions. Here, anionic types such as sodium hydroxide, sodium methylate, potassium t-butylate, sodium amide and similar systems are chosen.

The first glycidolisation stage takes place even at temperatures below 100°C. Under these conditions, however, a higher glycidolisation ($n > 1$) is not possible. If the reaction is carried out from the start at a temperature of 115° – 130°C, then higher glycidolisation products can also be obtained. Under these conditions, the reaction products are statistical mixtures even for $n = 1$.

In general, the use of a solvent can be dispensed with. However, where a solvent is employed, high-boiling ethers, such as anisole, can above all be used.

The reaction which takes place under these conditions bears all the characteristics of a polymerisation. This means that structural type B is formed preferentially.

Both cationic and anionic catalysts can be employed for the reaction of mercaptans. As in the case of the phenols, the reaction at temperatures below 100°C terminates at the first, single-product, glycidolisation stage. Higher glycidolisation products, these being statistical mixtures, are only obtainable at temperatures above 120°C. Viewed overall, however, the anionic catalysts give the more advantageous reaction course.

Under these conditions, again, the course of the reaction can be described as a genuine polymerisation, which means that for $n > 1$ structural type B is formed preferentially.

The method described below is best for the statistical glycidolisation products with $X = SO_2$:

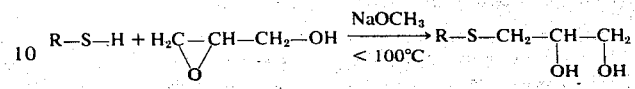

After conversion to the sulphone:

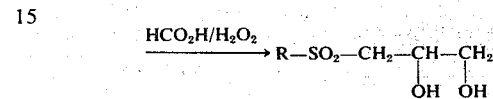

the further glycidolisation can be carried out as in the case of the alcohols.

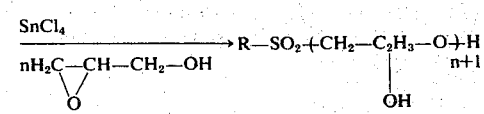

In principle, the conversion to the sulphone stage can also start from the glycidolisation product of a mercaptan, though in that case difficulties can arise in working up, especially in the case of products of a higher degree of glycidolisation.

Examples of starting products for the glycidolisation are listed below: Methanol, ethanol, n-propanol, i-propanol, n-butanol, i-butanol, butanol-2, i-amyl alcohol, n-hexanol, hexanol-2, hexanol-3, n-heptanol, heptanol-4, cyclohexanol, cyclopentanol, benzyl alcohol and 2-phenylethanol; phenol, ethylphenol, m-chlorophenol, p-cresol, hydroquinone monomethyl ether and p-hydroxybenzoic acid ethyl ester; butylmercaptan, n-hexylmercaptan, thiophenol and benzylmercaptan; compounds of the formula

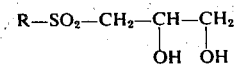

R: n-Hexyl, phenyl, benzyl and butyl.

In principle, all compounds according to the invention with $n = 1$ can also be used as starting products for the glycidolisation.

The invention is explained in more detail in the examples which follow. Herein, percent (%) denotes per cent by weight and parts denote parts by weight.

EXAMPLE 1

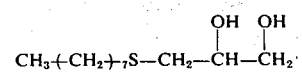

3-(Octylmercapto)-propanediol-(1,2)

16.2 parts of sodium methylate, 100 parts of methanol and 32.4 parts of 1-thioglycerol are brought together whilst cooling and the mixture is stirred for 30 minutes at room temperature. 44.4 parts of b 1- chlorooctane are then added dropwise and the mixture is then heated under reflux for 2 hours. After cooling to approx. 15°C, the sodium chloride which has precipitated is filtered off, the filtrate is concentrated and the residue is distilled in an oil pump vacuum.

Yield: 44.7 parts (68% of theory); yellowish crystals; boiling point $_{0.15}$: 140° – 141°C; melting point: 29° –32°C; S, calculated 14.55%, found 13.8%.

EXAMPLE 2

—CH$_2$—CH$_2$—O—CH$_2$—CH(OH)—CH$_2$(OH)

3-(Phenylethoxy)-propanediol-(1,2)

367 parts of phenylethanol and 3 parts of tin tetrachloride are warmed to 50°C and 55.5 parts of glycerol-glycid are then added dropwise, whilst stirring, in such a way that the temperature does not rise above 50°C. The mixture is then stirred for a further 3 hours at the same temperature, the excess phenylethanol is distilled off in a waterpump vacuum and the residue is distilled in an oil pump vacuum.

Yield: 85.7 parts (58% of theory); colourless liquid; boiling point $_{0.2}$: 143° – 144°C; $n_D^{20}$: 1.5261; C calculated 67.32% found 66.5% H calculated 8.22% found 8.3% O calculated 24.46% found 25.1%

EXAMPLE 3

CH$_3$—(CH$_2$)—CH(C$_2$H$_5$)—CH$_2$—O$_2$C—CH$_2$—S—CH$_2$—CH(OH)—CH$_2$(OH)

3-(2-Ethylhexyloxycarbonyl-methylmercapto)-propanediol-(1,2)

The synthesis is carried out under the conditions described in Example 5. The following starting products and reagents are used: 40.9 parts of thioglycollic acid 2-ethylhexyl ester, 14.8 parts of glycerol-glycid and 0.3 part of sodium methylate. The reaction product is not purified further.

Yield: 55.6 parts (100% of theory); colourless, viscous liquid; $n_D^{20}$: 1.4842; S, calculated 11.52%, found 11.3%.

EXAMPLE 4

CH$_3$—(CH$_2$)$_9$—O—CH$_2$—CH(OH)—CH$_2$(OH)

3-(Decyloxy)-propanediol-(1,2)

The synthesis is carried out under the conditions described in Example 2. The following starting products and reagents are used: 300 parts of n-decanol, 74 parts of glycerol-glycid and 3 parts of tin tetrachloride.

Yield: 125 parts (54% of theory); colourless crystals; boiling point $_{0.05}$: 148° – 150°C; melting point: 32° – 34°C; C calculated 67.20% found 66.8% H calculated 12.15% found 12 % O calculated 20.65% found 20.8%

EXAMPLE 5

CH$_3$—(CH$_2$)$_5$—S—CH$_2$—CH(OH)—CH$_2$(OH)

3-(Hexylmercapto)-propanediol-(1,2)

29.6 parts of 1-hexanethiol and 0.5 part of sodium methylate are heated to 40°C and 18.5 parts of glycerol-glycid are added in such a way that the temperature does not rise above 40°C. The mixture is then stirred for a further 30 minutes at 60°C. After cooling, the reaction mixture is distilled in an oil pump vacuum.

Yield: 32.2 parts (67% of theory); colourless liquid, boiling point $_{0.05}$: 106°–110°C; $n_D^{20}$: 1.4903; S calculated 16.67% found 17.3% O calculated 16.64% found 17.5%

EXAMPLE 6

CH$_3$—(CH$_2$)$_3$—S—CH$_2$—CH$_2$—CH$_2$—O—CH$_2$—CH(OH)—CH$_2$(OH)

3-(3-Butylmercapto-propoxy)-propanediol-(1,2)

132 parts of glycerol-1-allyl ether, 90 parts of butylmercaptan and 1.5 parts of benzoyl peroxide are stirred for 8 hours at 160° to 170°C. The completion of the reaction is checked by SH determination.

The reaction product is not purified.

Yield: 222 parts (100% of theory); yellowish liquid; S calculated 14.4%, found 14.2%.

EXAMPLES 7 – 34 (compare Table 1)

The conditions of preparation, and physico-chemical criteria, of all important glycidolisation products relating to the present invention are summarised in Table 1.

The total OH content (total OH) is determined by acetylation and the vicinal OH content (vic.-OH) is determined by splitting with periodic acid. However, in the case of the thioethers and certain phenol ethers, a determination of the vic.-OH is not possible, because of side reactions. A vapour pressure osmometer is used for the determination of the molecular weight.

EXAMPLE 35

Action on stability during processing

The action of the substances according to the invention in providing stability during processing is tested in various types of polyolefines, such as, for example, polypropylene, by means of the melt index determination (230°, 2.16 kg) after multiple extrusion in a single-screw extruder at 260°C and 100 rpm.

The change in the melt index after 1, 3 and 5 extrusions can be seen in Table 2.

EXAMPLE 36

Action on the substrate colour of high density polyethylene stabilised with phenolic antioxidants.

The substances according to the invention, together with known phenolic antioxidants, are worked in on a mixing mill for 10 minutes and the mixture is then pressed for 6 minutes at 260°C to give 1 mm thick sheets.

The colour behaviour is studied, using these pressed sheets, by determining the Yellowness Index by reflectance spectroscopy (reference: white filter paper, colour value 5.16) in comparison with corresponding sheets without test substance. The results are summarised in Table 3.

EXAMPLE 37

Intrinsic heat stability

Finally, the intrinsic heat stability of the compounds and substances according to the invention is examined.

The test is carried out in an open glass tube (internal diameter 2.5 mm) using a silicone bath which can be heated electrically. Bubble formation is taken as the criterion of decomposition. If a discolouration also occurs, this is also recorded.

After determining the decomposition range at a relatively high speed of heating in a preliminary experiment, the actual decomposition temperature is determined at a speed of heating of 2°C per minute (starting about 50°C below the decomposition temperature found in the preliminary experiment). The results are summarised in Table 3.

Table 1

(Examples 7 – 34)
Conditions of synthesis and physico-chemical criteria of the glycidolisation products of alcohols, phenols, mercaptans and sulphones (calculated values in parentheses)

| Example No. | Starting product | Degree of gly-cidol-isation $\bar{n}$ | Synthesis conditions Catalyst | Temperature,° | Analytical data % total OH | % vic.-OH | Molecular weight | Properties (consistency) |
|---|---|---|---|---|---|---|---|---|
| 7 | Methanol | 3 | SnCl$_4$ | 65 | 21.0 (26.7) | 15.0 (13.4) | — | $n_D^{20}$: 1.4840 |
| 8 |  | 5 | " | " | 22.9 (25.4) | 9.9 (8.5) | — | } Highly viscous liquids |
| 9 |  | 7 | " | " | 26.2 (30.9) | 7.1 (6.2) | — | |
| 10 | n-Butanol | 1 | SnCl$_4$ | 65 | 19.8 (23.0) | 13.7 (23.0) | 177(148) | $n_D^{20}$: 1.4438 |
| 11 |  | 3 | " | " | 19.7 (19.3) | 12.8 (11.5) | 282(296) | $n_D^{20}$: 1.4730 |
| 12 | 2-Ethylbutanol | 1 | SnCl$_4$ | 65 | 18.5 (19.3) | 10.0 (19.3) | 165(176) | |
| 13 |  | 3 | " | " | 20.9 (21.0) | 10.2 (10.5) | 330(324) | } Viscous liquids |
| 14 |  | 7 | " | " | 23.0 (21.9) | 7.1 (5.5) | 600(621) | |
| 15 | n-Heptanol | 1 | SnCl$_4$ | 65 | 17.7 (17.9) | 9.2 (17.9) | 175(190) | |
| 16 |  | 3 | " | " | 20.2 (20.1) | 10.4 (10.1) | 320(338) | Viscous liquid |
| 17 | n-Amyl alcohol | 3 | SnCl$_4$ | 65 | 21.2 (21.9) | 10.5 (11.0) | 290(310) | Viscous liquid |
| 18 | Cyclohexanol | 2 | SnCl$_4$ | 65 | 19.9 (20.5) | 12.1 (13.7) | — | $n_D^{20}$: 1.4844 |
| 19 |  | 4 | " | " | 19.2 (21.4) | 9.9 (8.5) | — | $n_D^{20}$: 1.4952 |
| 20 | Benzyl alcohol | 1 | SnCl$_4$ | 65 | 17.8 (18.7) | 10.5 (18.7) | 178(182) | $n_D^{20}$: 1.5293 |
| 21 | 2-Phenylethanol | 1 | SnCl$_4$ | 65 | 16.9 (17.3) | 9.4 (17.3) | — | $n_D^{20}$: 1.5265 |
| 22 |  | 3 | " | " | 19.2 (19.8) | 11.4 (9.9) | — | $n_D^{20}$: 1.5202 |
| 23 | Phenol | 2 | NaOMe | 120 | 20.5 (21.1) | 14.8 (14.0) | — | Viscous liquid |
| 24 |  | 4 | " | " | 21.5 (21.8) | 10.0 (8.7) | — | 178 viscous liquid |
| 25 | p-Ethylphenol | 1 | NaOMe | 120 | 16.9 (17.3) | 15.1 (17.3) | 175(196) | Viscous liquid |
| 26 | m-Chlorophenol | 2 | NaOMe | 120 | 19.0 (18.4) | 13.8 (12.3) | — | Highly viscous liquid |
| 27 |  | 5 | " | " | 19.2 (20.5) | 8.2 (6.8) | — | Highly viscous mass |
| 28 | n-Butylmercaptan | 3 | NaOMe | 120 | 20.9 (21.8) | — | 305(312) | Liquid |
| 29 |  | 5 | " | " | 22.0 (22.2) | — | 480(461) | Viscous liquid |
| 30 | Thiophenol | 1 | NaOMe | 120 | 17.6 (18.5) | — | 203(184) | M.p. 64 – 66° |
| 31 |  | 3 | " | " | 19.5 (20.5) | — | 355(332) | Highly viscous mass |
| 32 | n-Hexylmercaptan | 1 | KOCMe$_3$ | 120 | 16.7 (16.5) | — | — | $n_D^{20}$: 1.490 |
| 33 | n—C$_6$H$_{13}$—SO$_2$—CH$_2$—CH—CH$_2$<br>　　　　　　　　　　　　　\|　　　\|<br>　　　　　　　　　　　　　OH　OH | 2 | SnCl$_4$ | 65 | 13.1 (13.7) | 9.8 (9.1) | 395(372) | } Waxy compositions |
|  |  | 4 | " | " | 16.0 (16.3) | 6.7 (6.5) | 570(521) | |

Table 2

(Example 35)
Action on the processing stability of polypropylene (MFI 3)

| Test substance (Concentration) added: 0.5% |  | Corresponding to Example | Melt indices after extrusions | | |
|---|---|---|---|---|---|
|  |  |  | 1 | 3 | 5 |
| None |  |  | 7.4 | 17 | 32 |
| R—O—(CH$_2$—C$_2$H$_3$—O)$_{\bar{n}}$H<br>　　　　　　　\|<br>　　　　　　　OH | | | | | |
| R: n-heptyl | $\bar{n}$: 1 | 15 | 6.0 | 7.6 | 11.5 |
| R: n-butyl | $\bar{n}$: 1 | 10 | 6.3 | 8.6 | 13.5 |

Table 2-Continued (Example 35)
Action on the processing stability of polypropylene (MFI 3)

| Test substance (Concentration) added: 0.5% |  | Corresponding to Example | Melt indices after extrusions | | |
|---|---|---|---|---|---|
|  |  |  | 1 | 3 | 5 |
| R: phenyl | $\bar{n}$: 3 | 11 | 6.7 | 9.1 | 13.2 |
|  | $\bar{n}$: 2 | 23 | 6.8 | 10.5 | 14.8 |
|  | $\bar{n}$: 4 | 24 | 6.4 | 9.5 | 13.9 |
| R: methyl | $\bar{n}$: 3 | 7 | 4.2 | 5.0 | 9.3 |
|  | $\bar{n}$: 7 | 9 | 4.2 | 4.8 | 8.0 |
| R: cyclohexyl | $\bar{n}$: 2 | 18 | 6.6 | 12.0 | 16.5 |
| R: phenylethyl | $\bar{n}$: 3 | 22 | 6.1 | 8.9 | 12.8 |
| R—S—(CH$_2$—C$_2$H$_3$—O)$_{\bar{n}}$H<br>　　　　　　　\|<br>　　　　　　　OH | | | | | |
| R: hexyl | $\bar{n}$: 1 | 32 | 5.8 | 7.0 | 10.5 |
| R: phenyl | $\bar{n}$: 3 | 31 | 6.5 | 9.0 | 12.0 |
| R—SO$_2$—(CH$_2$—C$_2$H$_3$—O)$_{\bar{n}}$H<br>　　　　　　　　\|<br>　　　　　　　　OH | | | | | |
| R: hexyl | $\bar{n}$: 2 | 33 | 5.5 | 7.8 | 11.4 |
| R—O—CH$_2$—CH—CH$_2$<br>　　　　　　　\|　　　\|<br>　　　　　　　OH　OH | | | | | |
| R: n-decyl |  | 4 | 6.2 | 9.2 | 14.4 |
| R: 2-phenylethyl |  | 2 | 5.3 | 8.0 | 11.2 |
| R: cyclohexyl |  | * | 5.4 | 10.9 | 14.2 |
| R: phenyl |  | * | 4.8 | 7.7 | 11.3 |
| R: butyl |  | * | 4.5 | 6.0 | 8.5 |
| n—hexyl—S—CH$_2$—CH—CH$_2$<br>　　　　　　　　　　\|　　\|<br>　　　　　　　　　　OH　OH | | * | 4.8 | 7.5 | 11.1 |
| n—butyl—SO$_2$—CH$_2$—CH—CH$_2$<br>　　　　　　　　　　　\|　　\|<br>　　　　　　　　　　　OH　OH | | * | 5.0 | 7.8 | 11.4 |

*Known substances

Table 3 Action on the substrate colour of high density (Example 36) polyethylene stabilised with phenolic antioxidants i. Test substances (P):

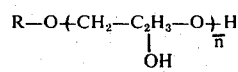

R: methyl    $\bar{n}$: 7 .... P I
R: n-butyl   $\bar{n}$: 1 .... P II ii. Antioxidants (AO):

| | |
|---|---|
| Octadecyl-3(3,5-di-t-butyl-4-hydroxyphenyl)-propionate | AO 1 |
| Pentaerythritol-tetrakis-[3,4-di-t-butyl-4-hydroxyphenyl)-propionate] | AO 2 |
| 1,1,3-Tris-(5-t-butyl-4-hydroxy-2-methylphenyl)-butane | AO 3 | iii. Results:

| Antioxidant (0.05%) | Test substance (0.05%) | Yellowness Index |
|---|---|---|
| AO 1 | — | 15.17 |
| AO 1 | P I | 5.34 |
| AO 1 | P II | 5.33 |
| AO 2 | — | 10.55 |
| AO 2 | P I | 6.48 |
| AO 3 | — | 18.62 |
| AO 3 | P I | 9.17 |

Table 4

(Example 37)
Decomposition temperatures of substances according to the invention

| Test substance | Corresponding to Example | Decomposition temperature (°C) | Bubble formation | Discoloration |
|---|---|---|---|---|

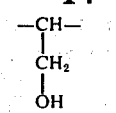

| R: n-octyl | X : O | * | 265 | + | |
| R: i-octyl-O₂C-CH₂- | X : S | 3 | 190 | + | |
| R: phenyl | X : O | * | 200 | + | + |
| R: phenyl | X : S | * | 195 | + | + |
| R: n-hexyl | X : SO₂ | * | 245 | + | + |
| R: m-chlorophenyl | X : O | * | 230 | + | + |

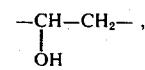

| X : O | | | | | |
| R: methyl | $\bar{n}$: 3 | 7 | 270 | + | |
| R: 2-ethylbutyl | $\bar{n}$: 7 | 14 | 240 | + | |
| R: 2-phenylethyl | $\bar{n}$: 3 | 22 | 260 | + | |
| R: phenyl | $\bar{n}$: 2 | 23 | 195 | + | + |
| X: S | | | | | |
| R: butyl | $\bar{n}$: 5 | 29 | 230 | + | |
| R: phenyl | $\bar{n}$: 3 | 31 | 205 | + | + |

* Known substances

What we claim is:
1. Polyolefins which contain 0.01 – 5% by weight, based on the polymer of a compound or mixtures of the formula
R—X—(CH₂—Y—O—)ₙH
in which X denotes —O—, —S— or —SO₂—, Y denotes

$$-CH-$$
$$\ \ |$$
$$CH_2$$
$$\ \ |$$
$$OH$$

or $$-CH-CH_2-,$$
$$\ \ |$$
$$OH$$

n denotes the number 1 to 5, or $\bar{n}$ denotes a number between 1 and 8, and R denotes cycloalkyl with 5 to 6 carbon atoms, phenylalkyl with an alkyl radical of 1 to 2 carbon atoms, which can be substituted by methyl on the phenyl nucleus, with the phenylalkyl radical R being allowed to have a total of at most 8 carbon atoms, phenyl which can be substituted by halogen, methyl, ethyl, methoxy, ethoxy or methoxycarbonyl, with the substituted phenyl radical being allowed to have at most 8 carbon atoms, or, in the case that n = 1, alkyl with a total of 4 to 11 carbon atoms, which can be linear, or have short branch chains of at most 2 carbon atoms and/or can be unsaturated, or, in the case that $\bar{n}$ = 1 to 1.9, alkyl with 4 to 7 carbon atoms, which can be linear, branched and/or unsaturated, or in the case that n = 2 to 5 and $\bar{n}$ = 2 to 8, alkyl with 1 to 7 carbon atoms, which can be linear, branched and/or unsaturated, it also being possible, in all cases, for the alkyl chain to be interrupted by —O—, —S—, —CO₂— or

and optionally, in addition to further additives, at most 1% by weight, relative to the polyolefin, of hydrophilic polymers.

2. Polyolefins according to claim 1, characterised in that the polyolefin is low pressure polyethylene or polypropylene.

3. Polyolefins according to claim 1, in which Y denotes

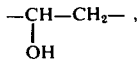

X denotes O or S, *n* denotes the number 1 and R denotes an unbranched alkyl with 4 to 11 carbon atoms.

4. Polyolefins according to claim 1, in which Y denotes

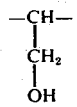

or

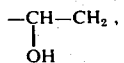

X denotes O or S, $\bar{n}$, as an average value, denotes a number between 1 and 5 and R denotes an unbranched alkyl with 4 to 7 carbon atoms.

5. Polyolefins according to claim 1, characterised in that they contain substances of the formula in amounts of 0.05 to 2% by weight, based on the polymer.

* * * * *